United States Patent [19]

Suárez et al.

[11] Patent Number: 4,667,906
[45] Date of Patent: May 26, 1987

[54] REPLACEABLE TIP FOR AIRCRAFT LEADING EDGE

[75] Inventors: Jesûs A. Suárez, Huntington; John R. Ewen, Centerport, both of N.Y.

[73] Assignee: Grumman Aerospace Corporation, Bethpage, N.Y.

[21] Appl. No.: 719,078

[22] Filed: Apr. 2, 1985

[51] Int. Cl.$^4$ ............................................. B64C 3/28
[52] U.S. Cl. .............................. 244/124; 244/117 A; 244/121; 416/224
[58] Field of Search ................... 244/124, 121, 117 A, 244/123; 416/224

[56] References Cited
U.S. PATENT DOCUMENTS 1,842,178  1/1932  Kempton ............................ 416/224
2,431,184 11/1947  Martin ................................ 416/224

FOREIGN PATENT DOCUMENTS 697159  9/1940  Fed. Rep. of Germany ...... 416/224
452841  8/1936  United Kingdom ................ 416/224

Primary Examiner—Trygve M. Blix
Assistant Examiner—Rodney Corl
Attorney, Agent, or Firm—Richard G. Geib; Daniel J. Tick; David Aker

[57] ABSTRACT

A replaceable tip for an aircraft leading edge and which has a metallic abrasion shield glove removably mounted to the leading edge of the aircraft, fasteners for securing the abrasion shield glove to the leading edge of the aircraft, and a non-metallic resilient cushion insert fixedly attached to the abrasion shield glove so that the resilient cushion insert forms a dampening arrangement which reduces the amount of damage to the aircraft leading edge when the replaceable leading edge tip is hit.

12 Claims, 1 Drawing Figure

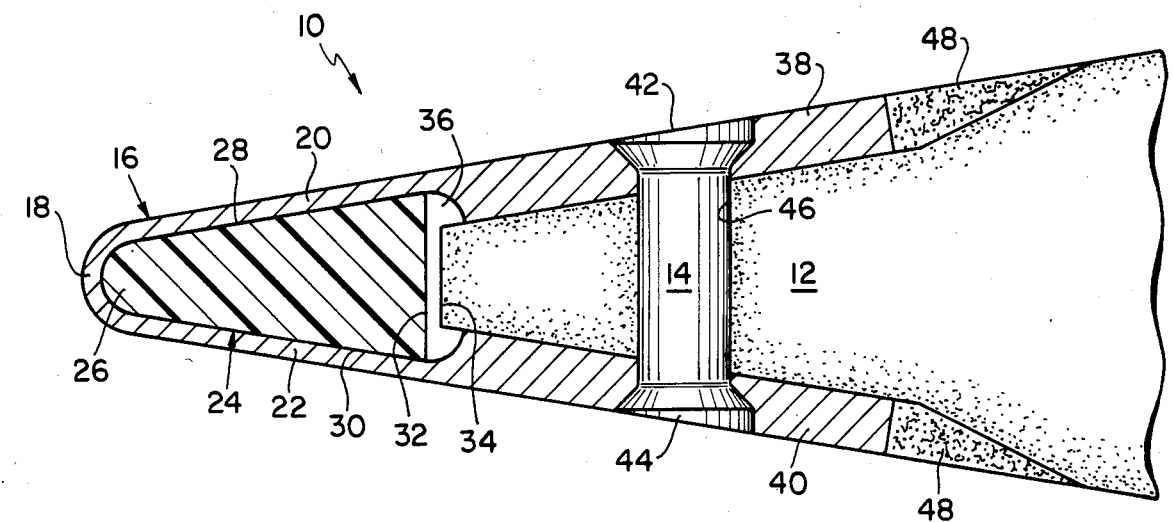

REPLACEABLE TIP FOR AIRCRAFT LEADING EDGE

BACKGROUND OF THE INVENTION

The present invention relates to a replaceable tip for an aircraft leading edge. More particularly, it relates to a replaceable tip for an aircraft leading edge, which includes a metallic abrasion shield glove that is removably mounted to the leading edge of the aircraft and means for securing the abrasion shield glove to the leading edge of the aircraft.

Replaceable tips for aircraft leading edges of the above mentioned general type are known in the art.

One such replaceable tip for an aircraft leading edge is disclosed, for example, in the U.S. Pat. No. 1,674,674 to Wooster. The patent to Wooster relates to aircraft propeller blades. The patent to Wooster teaches a non-rusting means of protecting the leading edges of propeller blades. The means include a wear resisting metal leading edge insert that is provided with a tongue for insertion in a groove formed in the leading edge of the propeller blade. However, the patent to Wooster does not teach the use of a non-metallic resilient cushion insert fixedly attached to an abrasion shield glove, so that the resilient cushion insert forms a dampening arrangement which reduces the amount of damage to the aircraft leading edge when the replaceable leading edge tip is hit.

Another such replaceable tip for an aircraft leading edge is disclosed, for example, in the U.S. Pat. No. 1,842,178 to Kempton. The patent to Kempton relates to tipping for the edges of propellers. The patent to Kempton teaches a metallic strip with slots cut into it from opposite sides in alternate relation. The metallic strip is riveted to the propeller blade. However, the patent to Kempton does not teach the use of a nonmetallic resilient cushion insert fixedly attached to the metallic strip, so that the resilient cushion insert forms a dampening arrangement which reduces the amount of damage to the aircraft leading edge when the replaceable leading edge tip is hit.

Finally, a further such replaceable tip for an aircraft leading edge is disclosed, for example, in the U.S. Pat. No, 2,389,760 to Brierley. The patent to Brierley relates to an arrangement for strengthening the leading edge of non-metallic aircraft airscrew blades against damage. The patent to Brierley teaches a reinforcement for the leading edge of the blade and which comprises a metallic sheath and a reinforcing metal rod secured inside, or to the outside of the sheath, and which is formed externally to the aerodynamic shape of the leading edge. However, the patent to Brierley does not teach the use of a non-metallic resilient cushion insert fixedly attached to the metallic sheath, so that the resilient cushion insert forms a dampening arrangement which reduces the amount of damage to the aircraft leading edge tip when the replaceable leading edge tip is hit.

The following patents are cited of interest but remote from Applicants' invention.

| U.S. Pat. No. | To |
| --- | --- |
| 2,087,626 | Minshall |
| 2,574,651 | Meyers |
| 2,574,980 | Meyers |
| 2,580,363 | Schnitt |
| 2,613,893 | Young |

-continued

| U.S. Pat. No. | To |
| --- | --- |
| 2,693,922 | Ellison et al |
| 2,963,094 | Cantinieau |
| 3,028,128 | Friedrich |
| 3,174,711 | Sullivan |
| 3,856,434 | Hoffmann |
| 4,010,530 | Delgrosso et al |

SUMMARY OF THE INVENTION

Accordingly, it is an object of the present invention to provide a replaceable tip for an aircraft leading edge which avoids the disadvantages of the prior art.

More particularly, it is an object of the present invention to provide a replaceable tip for an aircraft leading edge which is readily replaceable and includes a dampening arrangement.

In keeping with these objects, and with others which will become apparent hereinafter, one feature of the present invention resides, briefly stated, in a replaceable tip for an aircraft leading edge, which has a metallic abrasion shield glove removably mounted to the leading edge of the aircraft, means for securing the abrasion shield glove to the leading edge of the aircraft, and a non-metallic resilient cushion insert fixedly attached to the abrasion shield glove.

When the replaceable tip for an aircraft leading edge is designed in accordance with the present invention, the resilient cushion insert forms a dampening arrangement, which reduces the amount of damage to the aircraft leading edge when the replaceable leading edge tip is hit.

In accordance with another feature of the present invention, the securing means include a plurality of double flush fasteners.

Another feature of the present invention is that the abrasion shield glove is composed of aluminum.

Still another feature of the present invention is that the resilient cushion insert is composed of fiberglass reinforced nylon.

Yet another feature of the present invention is that the abrasion shield glove comprises a tip portion, a first leg portion, and a second leg portion.

Still yet another feature of the present invention is that the resilient cushion insert comprises a nose portion, a first side portion, and a second side portion.

Yet still another feature of the present invention is that the nose portion of the resilient cushion insert sits against the tip portion of the abrasion shield glove, and the first and second side portions of the resilient cushion insert sit against the first and second leg portions, respectively, of the abrasion shield glove.

Another feature of the present invention is that the abrasion shield glove further comprises a first leg portion extension and a second leg portion extension.

Still another feature of the present invention is that the first and second leg portion extensions have lengths that are entirely traversed by the leading edge of the aircraft.

Yet another feature of the present invention is that the resilient cushion insert further comprises a back portion lying in a first plane, and the leading edge of the aircraft has a front portion lying in a second plane.

Still yet another feature of the present invention is that the second plane of the front portion of the leading edge of the aircraft is disposed parallel to the first plane of the back portion of the resilient cushion insert.

Finally, still a further feature of the present invention is that the resilient cushion insert is bonded to the abrasion shield glove.

The novel features which are considered characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The Figure is a side view in partial cross section of the replaceable leading edge tip attached to a leading edge of an aircraft.

DESCRIPTION OF THE PREFERRED EMBODIMENT

Referring now to the Figure, the replaceable leading edge tip of the present invention is shown generally at 10, attached to a leading edge 12 of an aircraft. The replaceable leading edge tip 10 is fastened to the leading edge 12 of the aircraft by a plurality of double flush fasteners 14.

As shown, the replaceable leading edge tip 10 includes an abrasion shield glove 16 having a tip portion 18, a first leg portion 20, and a second leg portion 22. The abrasion shield glove 16 is bonded to and encompasses a resilient cushion insert 24.

The resilient cushion insert 24 has a nose portion 26, a first side portion 28, a second side portion 30, and a back portion 32. The nose portion 26 of the resilient cushion insert 24 sits against the tip portion 18 of the abrasion shield glove 16, and the first and second side portions 28 and 30 of the resilient cushion insert 24 sit against the first and second leg portions 20 and 22, respectively, of the abrasion shield glove 16.

The leading edge 12 of the aircraft is constructed with a flat front portion 34. The flat front portion 34 of the leading edge 12 of the aircraft lies in a plane that is parallel to the plane in which the back portion 32 of the resilient cushion insert 24 lies. The flat front portion 34 of the leading edge 12 of the aircraft may be shimmed to the back portion 32 of the resilient cushion insert 24 by a shim 36 disposed therebetween.

The first leg portion 20 of the abrasion shield glove 16 has a first leg portion extension 38 and the second leg portion 22 of the abrasion shield glove 16 has a second leg portion extension 40. The entire length of the broadened first and second leg portion extensions 38 and 40 traverse the leading edge 12 of the aircraft.

The first leg portion extension 38 of the abrasion shield glove 16 contains a plurality of first leg portion extension mounting holes 42 and the second leg portion extension 40 of the abrasion shield glove 16 contains a plurality of second leg portion extension mounting holes 44. A plurality of leading edge mounting holes 46 are also provided in the leading edge 12 of the aircraft.

The abrasion shield glove 16 is composed of aluminum (6061-T6), or the like, which is chromic acid anodized (per MIL-A-8625 Type 1 Class 1), or the like. It is primed with adhesive primer ("Hysol 9025"), or the like, and bonded with a BMI adhesive ("EA 934"), or the like, to the resilient cushion insert 24. The resilient cushion insert 24 is an injection molded fiberglass reinforced nylon 66 insert ("NYLAFIL" ®G10/14), or the like. The plurality of double flush fasteners 14 are TI-CB, or the like.

In operation, when the replaceable leading edge tip 10 becomes damaged, the plurality of double flush fasteners 14 are removed allowing for the removal and replacement of the replaceable leading edge tip 10. The resilient cushion insert 24, with or without the shim 36, forms a dampening arrangement which reduces the amount of damage to the aircraft leading edge 12 when the replaceable leading edge tip 10 is hit.

When the replaceable leading edge tip 10 is secured to the leading edge 12 of the aircraft, a filler compound 48 is applied, as indicated, to the joint line of the replaceable leading edge tip 10 and the leading edge 12 of the aircraft. The filler compound 48 is a filler sealant ("PR899") or the like, is easily removable, and serves to assure the integrity of the airfoil profile.

It will be understood that each of the elements described above, or two or more together, may also find a useful application in other types of constructions differing from the types described above.

While the invention has been illustrated and described as embodied in a replaceable tip for an aircraft leading edge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A replaceable tip for an aircraft leading edge, comprising:
   a metallic abrasion shield glove removably mounted to the leading edge of the aircraft;
   means for securing said abrasion shield glove to the leading edge of the aircraft;
   a non-metallic resilient cushion insert fixedly attached to said abrasion shield glove and forming a dampening arrangement which reduces the amount of damage to the aircraft leading edge when the replaceable leading edge tip is hit; and
   a shim disposed between said non-metallic resilient cushion and the leading edge of the aircraft so that the area between said non-metallic resilient cushion and the leading edge of the aircraft is entirely filled by said shim, said shim assisting in bonding said non-metallic resilient cushion to the leading edge of the aircraft and assisting said dampening arrangement.

2. A replaceable leading edge tip as defined in claim 1, wherein said securing means include a plurality of double flush fasteners.

3. A replaceable leading edge tip as defined in claim 1, wherein said abrasion shield glove is composed of aluminum.

4. A replaceable leading edge tip as defined in claim 1, wherein said resilient cushion insert is composed of fiberglass reinforced nylon.

5. A replaceable leading edge tip as defined in claim 1, wherein said abrasion shield glove comprises a tip portion, a first leg portion, and a second leg portion.

6. A replaceable leading edge tip as defined in claim 5, wherein said resilient cushion insert comprises a nose portion, a first side portion, and a second side portion.

7. A replaceable leading edge tip as defined in claim 6, wherein said nose portion of said resilient cushion insert sits against said tip portion of said abrasion shield glove and said first and second side portions of said resilient cushion insert sit against said first and second leg portions, respectively, of said abrasion shield glove.

8. A replaceable leading edge tip as defined in claim 5, wherein said abrasion shield glove further comprises a first leg portion extension and a second leg portion extension.

9. A replaceable leading edge tip as defined in claim 8, wherein said first and second leg portion extensions have lengths that are entirely traversed by the leading edge of the aircraft.

10. A replaceable leading edge tip as defined in claim 6, wherein said resilient cushion insert further comprises a back portion lying in a first plane and the leading edge of the aircraft has a front portion lying in a second plane.

11. A replaceable leading edge tip as defined in claim 10, wherein said second plane of said front portion of the leading edge of the aircraft is disposed parallel to said first plane of said back portion of said resilient cushion insert.

12. A replaceable leading edge tip as defined in claim 1, wherein said resilient cushion insert is bonded to said abrasion shield glove.

* * * * *

UNITED STATES PATENT AND TRADEMARK OFFICE
CERTIFICATE OF CORRECTION

PATENT NO. : 4,667,906

DATED : May 26, 1987

INVENTOR(S) : JESUS A. SUAREZ ET AL

It is certified that error appears in the above-identified patent and that said Letters Patent are hereby corrected as shown below:

ON THE TITLE PAGE;

second column, last name "David Aker" should be -- Bernard S. Hoffman --

Signed and Sealed this

Fifteenth Day of September, 1987

Attest:

DONALD J. QUIGG

Attesting Officer

Commissioner of Patents and Trademarks